United States Patent
Jacobson et al.

(10) Patent No.: US 9,485,305 B2
(45) Date of Patent: Nov. 1, 2016

(54) API PLATFORM THAT INCLUDES SERVER-EXECUTED CLIENT-BASED CODE

(71) Applicant: NETFLIX, Inc., Los Gatos, CA (US)

(72) Inventors: Daniel Jacobson, Los Altos, CA (US); Benjamin James Christensen, San Jose, CA (US); Ben Schmaus, San Jose, CA (US); Mikey Cohen, Santa Cruz, CA (US); Poornaprajna Udupi, San Jose, CA (US); Jason Cacciatore, San Jose, CA (US); Ganapriya Poolavari, Saratoga, CA (US)

(73) Assignee: NETFLIX, Inc., Los Gatos, CA (US)

( * ) Notice: Subject to any disclaimer, the term of this patent is extended or adjusted under 35 U.S.C. 154(b) by 517 days.

(21) Appl. No.: 13/890,782

(22) Filed: May 9, 2013

(65) Prior Publication Data

US 2013/0318154 A1    Nov. 28, 2013

Related U.S. Application Data

(60) Provisional application No. 61/644,977, filed on May 9, 2012, provisional application No. 61/794,579, filed on Mar. 15, 2013.

(51) Int. Cl.
*G06F 15/16* (2006.01)
*H04L 29/08* (2006.01)
*G06F 17/30* (2006.01)

(52) U.S. Cl.
CPC ......... *H04L 67/10* (2013.01); *G06F 17/30905* (2013.01); *H04L 29/08792* (2013.01); *H04L 67/2823* (2013.01)

(58) Field of Classification Search
CPC ............... H04L 67/10; H04L 67/2823; H04L 29/08792; G06F 17/30905
See application file for complete search history.

(56) References Cited

U.S. PATENT DOCUMENTS

2007/0088837 A1    4/2007   Gidron et al.

FOREIGN PATENT DOCUMENTS

EP            1489814 A2    12/2004

OTHER PUBLICATIONS

Coward et al., J2EE Client Provisioning Specification Version 1.0, Aug. 27, 2003, pp. 7-61.*
European Search Report for Application No. 13167182.8-1856, dated Sep. 16, 2013.
Larson, Eric D. "An Overview of JSR 124: J2EE Client Provisioning", Internet Citation, Feb. 2003, p. 1, sections "What is Provisioning?" and "The Provisioning API"; p. 3, section "Discovery"; p. 4, section "Delivery," available at http://developers.sun.com/techtopics/mobility/midp/articles/provisioning/index.html.

* cited by examiner

*Primary Examiner* — Hee Soo Kim
(74) *Attorney, Agent, or Firm* — Artegis Law Group, LLP

(57) ABSTRACT

A technique for providing an API from a server to one of more endpoint devices including receiving a request for data from a endpoint device, retrieving one or more data resources from the data resources available within the server, based upon the request, manipulating the data within the retrieved data resources into a response optimized for the endpoint device, and transmitting the response to the endpoint device.

21 Claims, 5 Drawing Sheets

API PLATFORM THAT INCLUDES SERVER-EXECUTED CLIENT-BASED CODE

CROSS-REFERENCE TO RELATED APPLICATIONS

This application claims benefit of U.S. provisional patent application Ser. No. 61/644,977, filed May 9, 2012, and U.S. provisional patent application Ser. No. 61/794,579, filed Mar. 15, 2013, both of which are herein incorporated by reference.

BACKGROUND OF THE INVENTION

1. Field of the Invention

Embodiments of the present invention generally relate to computer science and, more specifically, to an application programming interface (API) that includes server-executed client-based code.

2. Description of the Related Art

In a traditional API model, the network serves as a hard boundary between a client application and an API server tier. The API server tier provides a generalized interface for accessing certain data resources to all types of client applications. Each client application may request these generalized data resources from the API server tier. By providing a generalized interface, the traditional API server tier establishes a clear set of rules that allow many different client applications potentially running on dissimilar devices to retrieve the same data resources in the same manner.

Computing devices have proliferated in recent years and many companies would like to provide their content to as many different devices as possible. Oftentimes this results in client applications being built specifically for each device. Across these myriad devices there is a high degree of variability in functionality, including from game consoles, TVs, set-top boxes, smartphones, etc. This variability of functionality results in a divergence in the data resource requirements of the client applications specific to the different devices. For instance, different devices may have different memory capacity, may require a unique or proprietary format or delivery method, or may have different screen real estate sizes. Although a client application may require specific data in a specific format, the API server tier only provides the generalized data resources. For instance, an API server tier providing access to movie information may respond to all requests for suggested movie titles with a generalized data resource containing 100 movie titles, regardless of how many movie titles a particular client application actually displays on a device or what data formats are required by the device. As the number of different types of client applications running on these different devices continues to expand, the traditional API model of generalized data resources poses significant development challenges.

Although APIs built with the traditional model may not be optimized for the specific client applications, the client applications may extract the data from the generalized data resources. However, this data extraction can cause significant inefficiencies. Different client applications may perform large numbers of requests to retrieve the required data, which consumes network bandwidth. Furthermore, to gather the required content, the same or different client applications may request, receive, and then discard significant amounts of extra data. For instance, a client application running on a mobile device may receive 100 movie titles from an API, but only display five movie titles, so the other 95 movie titles are simply discarded. These inefficiencies may result in network latencies, which could cause an application to load or respond slowly.

Furthermore, the development and maintenance of a traditional API that supports myriad client applications can become increasingly difficult. As the number of client applications increases, the number of different requirements increases. Supporting an increasing number of requirements consumes more development time and resources and/or delays client application production. For instance, if a new device requires data in a unique format, then API development resources have to be diverted to create new data resources for the device. Likewise, the production of a client application for the device may be delayed until the API is appropriately updated to accommodate the unique data format.

As the foregoing illustrates, there remains a need for more effective techniques for providing data resources optimized for an expanding number of different client applications.

SUMMARY OF THE INVENTION

One embodiment of the present invention sets forth a method for providing an API from a server to one of more endpoint devices including receiving a request for data from a endpoint device, retrieving one or more data resources from the data resources available within the server, based upon the request, manipulating the data within the retrieved data resources into a response optimized for the endpoint device, and transmitting the response to the endpoint device.

Other embodiments of the present invention include, without limitation, a computer-readable storage medium including instructions that, when executed by a processing unit, cause the processing unit to implement aspects of the approach described herein as well as a system that includes different elements configured to implement aspects of the approach described herein.

One advantage of the approach described herein is that it allows more efficient interactions between the device and the server since most calls that otherwise would be going across the network can be handled on the server. Wide area network transactions are expensive, so reducing the number of network requests improves performance. Another advantage provided by this technique is a distributed nature of API development. Specifically, given that UI development teams can create and modify their own server-side components independently from the API server, this architecture allows them to be much more nimble in development without having server teams dictating interaction and data models, being a bottleneck for their development, or risking other device implementations with tactical changes in their device-specific APIs.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention may be used to provide data resources optimized for different client applications. Client applications running on different devices may have diverse data resource requirements. For instance, if an API server tier provides access to movie information, such as pictures of movie box art, then a client application designed for a mobile device, with a small display space, may require smaller pictures than a client application designed for a TV, with a much larger display space. To provide support for both such client applications, the API server tier may provide distinct data resources optimized for each client application.

In one embodiment, the client application extends to encompass both code running on the device and the API server tier. The capability to extend a client application across the device and API server tier is accomplished by defining and managing server components that are tightly coupled to individual device platforms. The API server tier enables the creation of endpoints customized for each device. Each endpoint supports data resources specific to the targeted device. The client application is configured to extend from a client application front-end running on the device through the network to a client adapter running in the API server tier. The client adapter handles requests to the endpoint from the target device and responds in the most optimal way possible for device. To respond with the request data, the client adapter retrieves data from other server components.

In the following description, numerous specific details are set forth to provide a more thorough understanding of the present invention. However, it will be apparent to one of skill in the art that the present invention may be practiced without one or more of these specific details.

Figure 1:
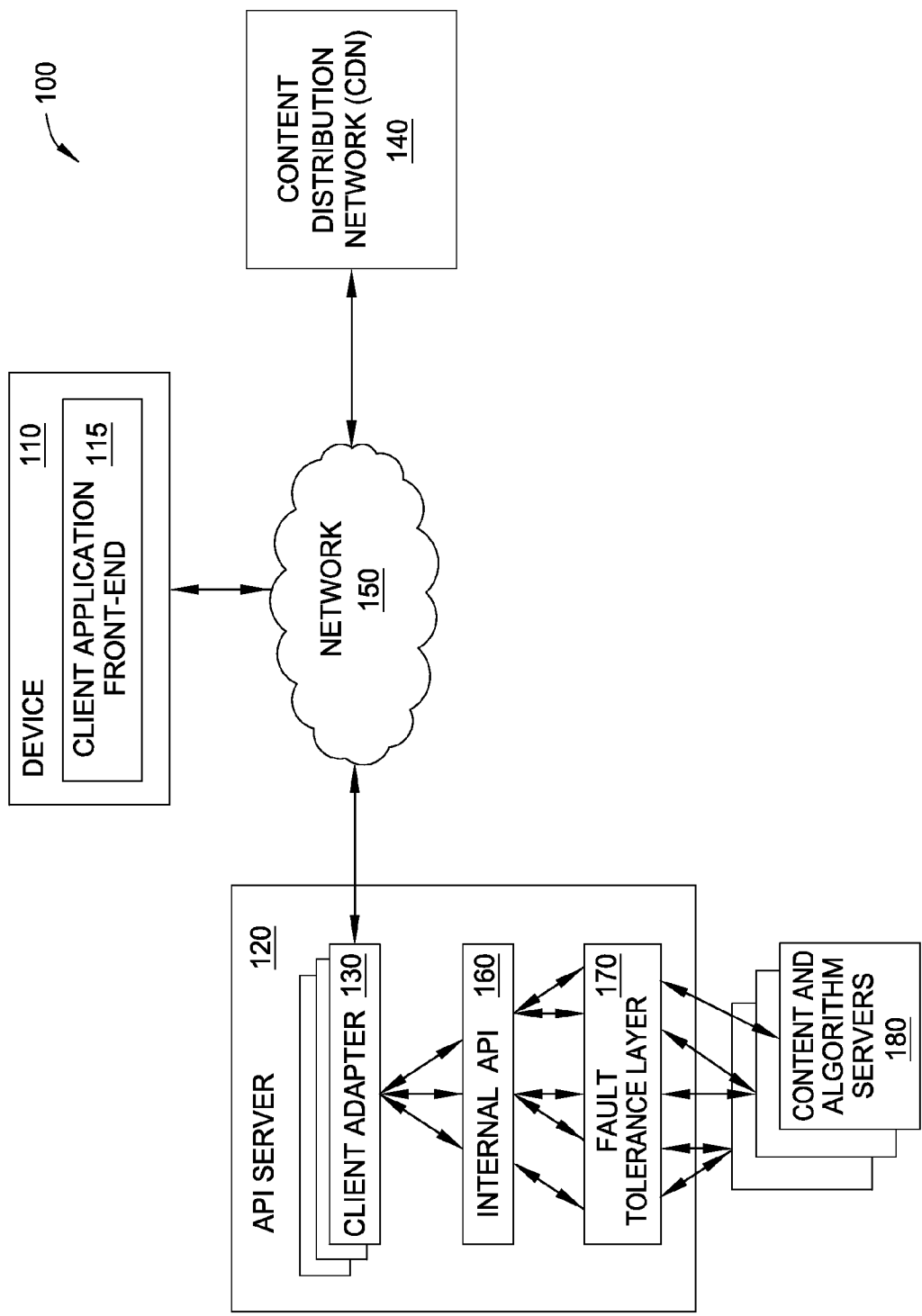
FIG. 1 is a block diagram illustrating a content distribution system configured to implement one or more aspects of the present invention.

FIG. 1 is a block diagram illustrating a content distribution system 100 configured to implement one or more aspects of the present invention. As shown, the content distribution system 100 includes an endpoint device 110, an API server 120, a content distribution network (CDN) 140, a network 150, and one or more user interface (UI) content servers 180.

The network 150 includes a plurality of network communications systems, such as routers and switches, configured to facilitate data communication between the API Server 120, the CDN 140, and the endpoint device 110. Persons skilled in the art will recognize that many technically feasible techniques exist for building the network 104, including technologies practiced in deploying the well-known internet communications network.

The UI content servers 180 provide content browsing guides, manage account information regarding users of the endpoint device 110, and provide DRM licenses associated with protected content that is viewed by those users.

The CDN 140 comprises one or more computer systems configured to serve download requests for digital content files, such as digital video files, received from the endpoint device 110. The digital content files may reside on a mass storage system accessible to the computer system. The mass storage system may include, without limitation, direct attached storage, network attached file storage, or network attached block-level storage. The digital content files may be formatted and stored on the mass storage system using any technically feasible technique. A data transfer protocol, such as the well-known hyper-text transfer protocol (HTTP), may be used to download digital content files from the CDN 140 to the endpoint device 110.

The endpoint device 110 may comprise a computer system, a set top box, a mobile device such as a mobile phone, or any other technically feasible computing platform that has network connectivity and is coupled to or includes a display device and speaker device for presenting video frames, and generating acoustic output, respectively. The endpoint device 110 may include a client application front-end 115. The client application front-end 115 provides a UI that allows a user to browse through and watch digital content files that are served by the CDN 140. In order to render the UI the client application front-end 115 requests and assembles UI content from the API server 120. A data transfer protocol, such as HTTP, may be used to transfer UI content from the API Server 120 to the endpoint device 110.

The API Server 120 includes one or more client adapters 130, an internal API 160, and a fault tolerance layer 170. The API Server 120 gathers, prepares, and delivers UI content from the UI content servers 180 to the client application front-end 115. To support the requests for UI content from the client application front-end, the API Server 120 requests different types of UI content from the different UI content servers 180. The API server 120 and the UI content servers 180 may use a data transfer protocol, such as HTTP, and data formats, such as XML or JSON, to communicate over the network 150.

Conventionally, "client code" is all code that lives on a given endpoint device 110 while "server code" is the code that resides on the API server 120. The divide between the two is traditionally the network border. The client adapter 130 within the API server 120 pushes the border back into the API server 130. All of the client application front-end 115 code on the endpoint device 110 is still client code, but some client code also resides and executes on the API server 120. The client code on the API server 120 forms the client adapter 130. The client application front-end 115 makes a network request to the client adapter 130 residing on the API server 120, which can handle the request in a manner specific to the endpoint device 110. The request may be for UI content specific to a UI of the endpoint device 110, such as the UI content of the application home screen, rather than a generalized data resource.

On the API server 120, the client adapter 130 expands the request from the client application front-end 115 to a series of sub-requests to the internal API 160 to gather the requested UI content. The client adapter 130 may be a Groovy script, where the requests would be java method calls to a Java based internal API 160. The client adapter 130 may make the sub-requests concurrently, so that the internal API 160 may process the sub-requests in parallel.

The parallel execution of the client adapter 130 sub-requests is an important performance factor for the internal API 160, which can affect the performance of the content distribution system 100. The internal API 160 may implement a "functional reactive programming" (FRP) model to provide for concurrent method calls from the client adapter 130. Following the FRP model, the methods provided by the internal API 160 return observables. An observable is a data type that allow a producer, the internal API 160, to push UI content to a consumer, the client adapter 130, as the UI content becomes available. From the perspective of the client adapter 130, the observables asynchronously emit the requested UI content, so the client adapter 130 may make concurrent sub-requests and then react as the UI content becomes available. Likewise, the FRP model allows the internal API 160 to return the UI content to the client adapter 130 asynchronously, so the internal API 160 is able to retrieve and process different UI content from the different UI content servers 180 in parallel.

The UI content is stored within the UI content servers 180. In response to the sub-requests from the client adapter 130, the internal API 160 makes requests to the UI content servers 180. However, the content distribution system 100 may include many UI content servers 180, so at some point communications with one or more UI content server 180 may fail. A failure to retrieve the UI content could potentially jeopardize the functionality of the internal API 160. Therefore, the internal API 160 accesses the UI content servers 180 through the fault tolerance layer 170. The fault tolerance layer 170 isolates the internal API 160 and thus the client adapter 130 from potential communication failures. To isolate the internal API 160 from these failures, the fault tolerance layer 170 may wrap requests to the UI content servers 180 in separate threads. The fault tolerance layer 170 may also implement fallback logic to provide graceful responses to failures, such as returning default UI content.

Assuming that the internal API 160 is able to retrieve the requested UI content from the UI content servers 180, the internal API 160 returns the UI content to the requesting client adapter 130. As discussed, the internal API 160 may asynchronously push the UI content to the client adapter 130 through an observable data type. Depending on the responses from the internal API 160, the client adapter 130 may submit subsequent sub-requests for additional UI content. The client adapter 130 may also handle errors returned by the internal API 160. The client adapter 130 may be configured to handle the responses all together or as each sub-request returns.

The internal API 160 returns UI content that is generalized and not specific to the endpoint device 110. The client adapter 130 manipulates the generalized UI content to make the UI content specific to the endpoint device 110. The client adapter 130 prunes and formats the generalized UI content into a single optimal response for the client application front-end 115. Ideally, formatting and interaction models are defined on a per endpoint device 110 type basis. In some cases, the system may need to format the data to a proprietary XML structure required by a particular endpoint device 110. Other endpoint device 110 may want the UI content delivered in different JSON or XML document formats, while others may want to receive bits streamed over the network. Once the optimized response includes the requested UI content, the client adapter 130 delivers a single data payload across the network to the client application front-end 115.

Upon receipt, the client application front-end 115 parses the optimized response and may directly populate a UI specific to the endpoint device 110. As the foregoing illustrates, with the client adapter 130 portion of the client application optimizing responses from the API Server 120, the client application is advantageously able to populate a UI from a single response, which could reduce the wait time of the user.

Although, in the above description, the content distribution system 100 is shown with one endpoint device 110 and one CDN 140, persons skilled in the art will recognize that the architecture of FIG. 1 contemplates only an exemplary embodiment of the invention. Other embodiments may include any number of endpoint devices 110 and/or CDNs 140. Thus, FIG. 1 is in no way intended to limit the scope of the present invention in any way.

Figure 2:
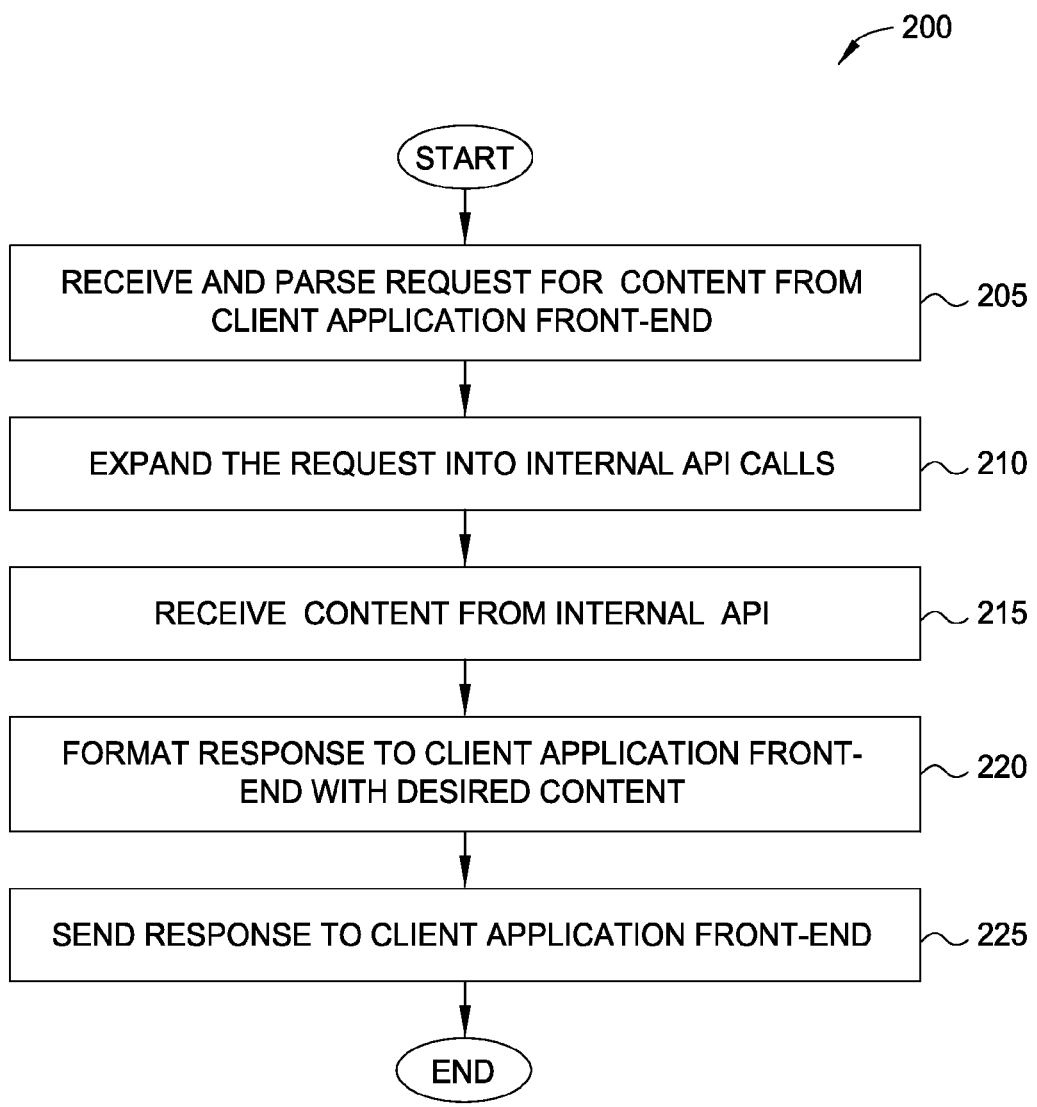
FIG. 2 illustrates a method for responding to a request from the client application front-end, according to one embodiment.

FIG. 2 illustrates a method for responding to a request from the client application front-end 115, according to one embodiment. More specifically, method 200 illustrates the response process described above from the perspective of the client adapter 130.

As shown, the method 200 begins at step 205, when the client adapter 130 receives and parses a request for UI content from the client application front-end 115. As discussed above, the client application front-end 115 and the client adapter 130 are both parts of the same client application developed for a particular type of endpoint device 110. The request may be an HTTP request with JSON or XML content.

At step 210, the client adapter 130 expands the request into sub-requests to the internal API 160. These sub-requests may be method calls performed concurrently or in series, according to the design of the client adapter 130.

At step 215, the client adapter 130 receives the UI content from the internal API 160. If the internal API 160 method calls initially return observables, then the internal API 160 asynchronously produces UI content through the observables. The client adapter 130 may process each response from the internal API 160 as the response is received or may wait to process all of the UI content together after all the internal API sub-requests have completed. The internal API 160 returns generalized UI content, which the client adapter 130 manipulates into the UI content specifically required by the client application front-end 115.

At step 220, the client adapter 130 optimally formats the response for the client application front-end 115. The formatting may be specific to the type of endpoint device 110.

At step 225, the client adapter 130 sends the response to the client application front-end 115. The transmission protocol used to send the response may be specific to the type of endpoint device 110. The response includes the requested UI content for the home screen of the client application front-end 115 in a single optimized payload.

Figure 3:
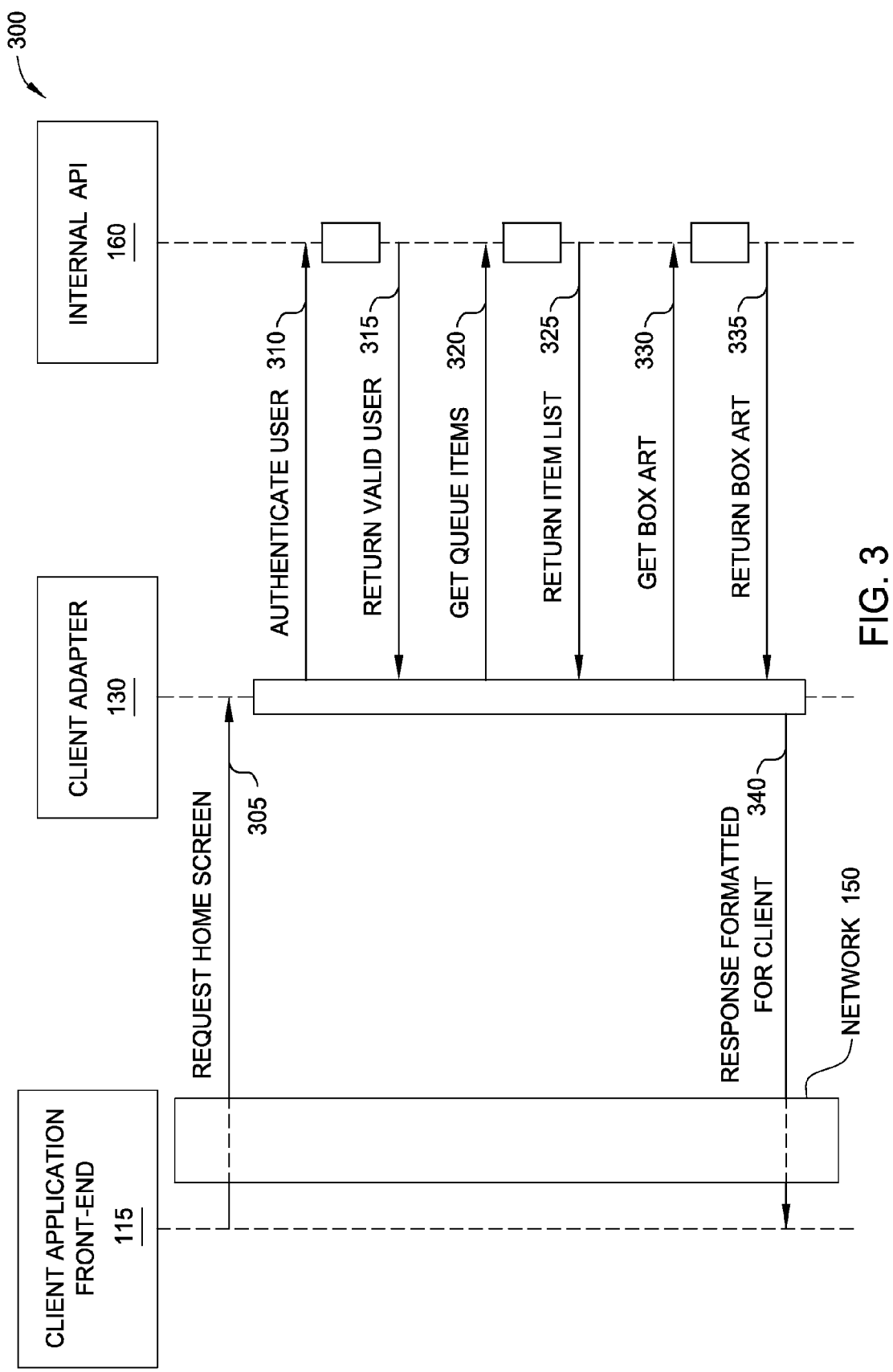
FIG. 3 illustrates a sequence diagram of the client adapter and internal API response to a request from the client application front-end, according to one embodiment.

FIG. 3 illustrates a sequence diagram 300 of the client adapter 130 and internal API 160 response to a request from the client application front-end 115, according to one embodiment. More specifically, sequence diagram 300 illustrates the requests and responses associated with displaying the home screen of an online video service. As shown, a client application front-end 115 requests the UI content for the home screen of the online video service (at 305) on the endpoint device 110. In response, the client adapter 130 expands the request into several sub-requests to the internal API 160. The client adapter 130 sends the sub-request 310 to authenticate the user, which the internal API 160 may then authenticate with a UI content server 180 before responding with valid user account details (at 315). At 320 the client adapter 130 sends the sub-request 320 to obtain a list of media titles that the user has in a queue 320. At 325, in response, the internal API 160 returns a list of media titles and identifiers, which the internal API 160 may gather from a UI content server 180. Based upon the list of video identifiers, the client adapter 130 then sends a sub-request to get the box art for each of the video identifiers (at 330). The internal API may then obtain the requested box art from a UI content server 180, before returning the box art to the client adapter 130 (at 335). The client adapter 130, then compiles and formats the retrieved video titles and box art for presentation as the UI content of the online video service home screen on the endpoint device 110. Once formatted, the client adapter 130 returns the optimized UI content to the client application front-end 115 (at 340). Note that although the requests and responses between the client adapter 130 and internal API 160 are shown in sequence, some or all of the requests may be made concurrently, where the internal API 160 would then process the requests in parallel as appropriate.

Figure 4:
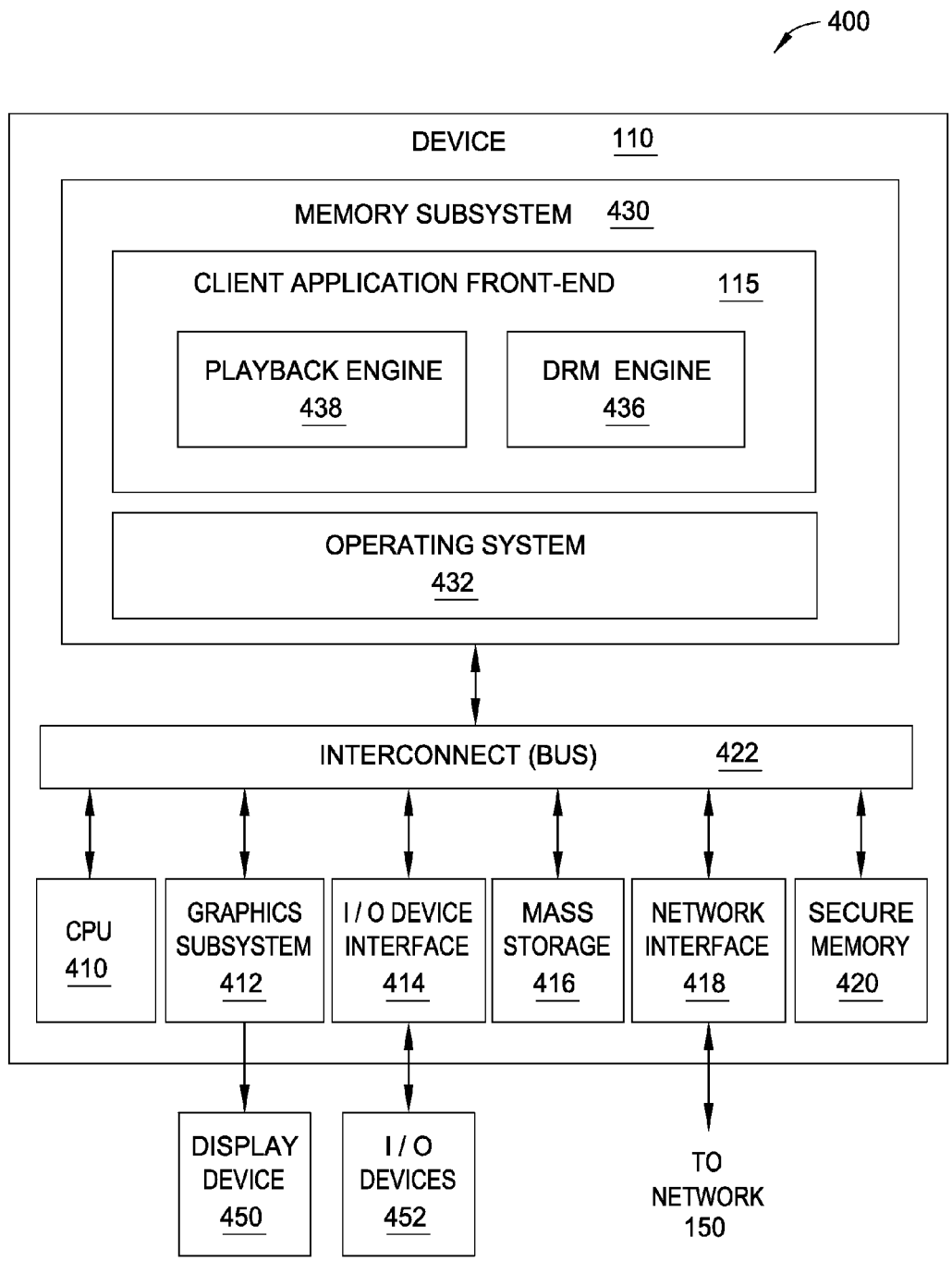
FIG. 4 is a more detailed view of an endpoint device, according to one embodiment of the invention.

FIG. 4 further illustrates the example endpoint device 110 of FIG. 1, according to one embodiment of the invention. As shown, the endpoint device 110 includes, without limitation, a central processing unit (CPU) 410, a graphics subsystem 412, an input/output (I/O) device interface 414, a network interface 418, a secure memory space 420, an interconnect (bus) 422, and a memory subsystem 430. The endpoint device 110 may also include a mass storage unit 416.

The CPU 410 is configured to retrieve and execute programming instructions stored in the memory subsystem 430. Similarly, the CPU 410 is configured to store and retrieve application data residing in the memory subsystem 430. The interconnect 422 is configured to facilitate transmission of data, such as programming instructions and application data, between the CPU 210, graphics subsystem 212, I/O devices interface 414, mass storage 416, network interface 418, secure memory space 420, and memory subsystem 430.

The graphics subsystem 412 is configured to generate frames of video data and transmit the frames of video data to display device 450. In one embodiment, the graphics subsystem 412 may be integrated into an integrated circuit, along with the CPU 410. The display device 450 may comprise any technically feasible means for generating an image for display. For example, the display device 450 may be fabricated using liquid crystal display (LCD) technology, cathode-ray technology, and light-emitting diode (LED) display technology (either organic or inorganic). An input/output (I/O) device interface 414 is configured to receive input data from user I/O devices 452 and transmit the input data to the CPU 410 via the interconnect 422. For example, user I/O devices 452 may comprise one of more buttons, a keyboard, and a mouse, touchpad, or other pointing device. The I/O device interface 414 also includes an audio output unit configured to generate an electrical audio output signal. User I/O devices 452 includes a speaker configured to generate an acoustic output in response to the electrical audio output signal. In alternative embodiments, the display device 450 may include the speaker, or the display device 450 may be a touch screen, which also acts as an I/O device 452. A television is an example of a device known in the art that can display video frames and generate an acoustic output. A mass storage unit 416, such as a hard disk drive or flash memory storage drive, is configured to store non-volatile data. A network interface 418 is configured to transmit and receive packets of data via the network 150. In one embodiment, the network interface 418 is configured to communicate using the well-known Ethernet standard. The network interface 418 is coupled to the CPU 410 via the interconnect 422.

The memory subsystem 430 includes programming instructions and data that comprise an operating system 432 and the client application front-end 115. The operating system 432 performs system management functions such as managing hardware devices including the network interface 418, mass storage unit 416, I/O device interface 414, and graphics subsystem 42. The operating system 432 also provides process and memory management models for the client application front-end 115. Persons skilled in the art will recognize the various operating systems that are well-known in the art and suitable for incorporation into the endpoint device 110.

The client application front-end 115 includes a DRM engine 436 and a playback engine 438. The client application front-end 115 allows users to browse through and watch digital content that is served by the CDN 140. The client application front-end 115 provides the UI experience with UI content retrieved from a client adapter 130 within the API server 120. The DRM engine 436 is configured to decrypt protected digital content received from the CDN 140. The playback engine 438 is configured to render the decrypted digital content.

Although shown in memory subsystem 430, the operating system 432 and the client application front-end 115, may be stored in memory subsystem 430, mass storage 416, or split between memory subsystem 430 and mass storage 416.

Figure 5:
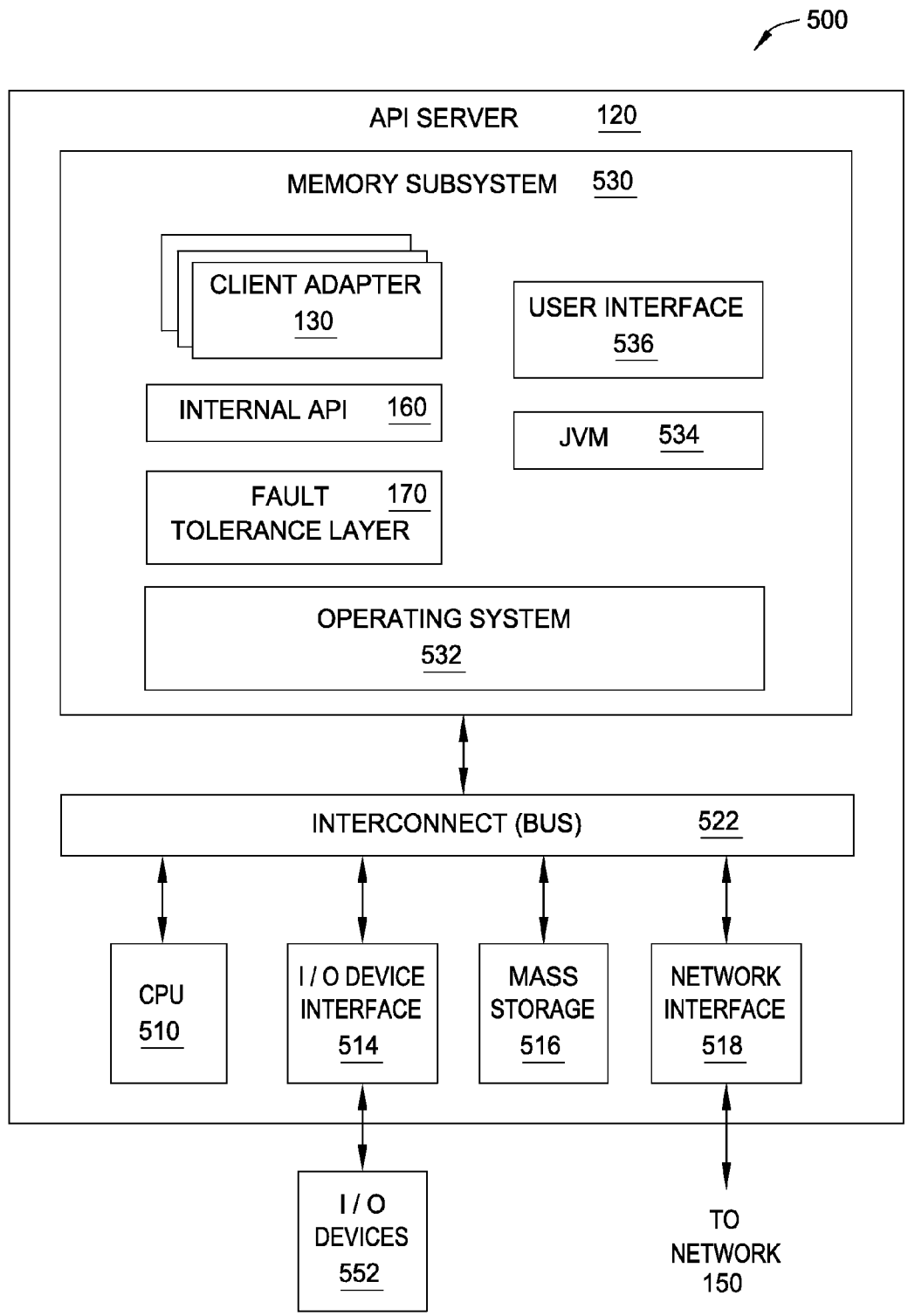
FIG. 5 is a more detailed view of an API server, according to one embodiment of the invention.

FIG. 5 is a more detailed view of the API server 120 of FIG. 1, according to one embodiment of the invention. The API server 120 includes, without limitation, a central processing unit (CPU) 510, a network interface 518, an interconnect (bus) 520, a memory subsystem 530, and a mass storage unit 516. The API server 120 may also include an I/O devices interface 514.

The CPU 510 is configured to retrieve and execute programming instructions stored in the memory subsystem 530. Similarly, the CPU 510 is configured to store and retrieve application data residing in the memory subsystem 530. The interconnect 522 is configured to facilitate transmission of data, such as programming instructions and application data, between the CPU 510, I/O devices interface 514, mass storage unit 516, network interface 518, and memory subsystem 530.

The memory subsystem 530 includes programming instructions and data that comprise an operating system 532, a Java Virtual Machine (JVM) 534, one or more client adapters 130, the internal API 160, the fault tolerance layer 170, and a user interface 536. The operating system 532 performs system management functions such as managing hardware devices including the network interface 518, mass storage unit 516, and I/O devices interface 514. The operating system 532 also provides process and memory management models for the JVM 534, the user interface 536, the client adapters 130, the internal API 160, the fault tolerance layer 170, and the user interface 536. The JVM 534 is a program that executes the bytecode of the client adapters 130, the internal API 160, and the fault tolerance layer 170.

The client adapters 130 are code written by developers, such as the developers of the client applications for the endpoint devices 110. The client adapters 130 are configured to execute on the API server 120 and be accessed by external applications, such as the client application front-ends 115. A client adapter 130 receives requests from the client application front-end 115 transmitted over the network 180 via the network interface 518. The client adapter 130 also transmits optimized responses specific to an endpoint device 110 back to the client application front-end 115. To compose the optimized responses, the client adapter 130 expands the request from the client application front-end 115 into a series of sub-requests to the internal API 160 to gather the requested UI content. In response to the sub-requests from the client adapter 130, the internal API 160 returns generalized UI content data to the client adapter 130. The internal API 160 retrieves the UI content from the UI content servers 180. The communications between the internal API 160 and the UI content servers 180 are transmitted over the network 150 via the network interface 518. The fault tolerance layer 170 wraps these communications in separate threads, to isolate the internal API 160 and thus the client adapter 130 from potential communication failures with UI content servers 180.

The user interface 536 provides a specific structure, such as a window and an object metaphor or a command line interface, for user interaction with the API server 120. A user may employ the user interface 536 to manage the client adapters 130. In one embodiment, the user interface 536 presents a management web page for managing operation of the client adapters 130. The API server 120 may include one or more versions of a client adapter 130 associated with a specific endpoint device 110. The management of the client adapters 130 may include the uploading, publishing, overwriting, and/or modification of new client adapters 130 or new versions of client adapters 130. The user may also manage the volume of requests, or network traffic, transmitted to specific versions of a client adapter 130, where the requests may be divided between one or more client adapters 130. Persons skilled in the art will recognize the various operating systems and user interfaces that are well-known in the art and suitable for incorporation into the API server 120.

Although shown in memory subsystem 430, the operating system 432, the JVM 534, the user interface 536, the client adapters 130, the internal API 160, and the fault tolerance layer 170, and the user interface 536, may be stored in memory subsystem 430, mass storage 416, or split between memory subsystem 430 and mass storage 416.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A method, comprising:
   delivering to at least of portion of client-based code within a server a first request for data received from an endpoint device, wherein the at least a portion of client-based code is associated with the endpoint device;
   expanding the first request into a plurality of sub-requests for at least a portion of server-based code within the server that is associated with a plurality of data resources;
   receiving from the at least a portion of server-based code one or more data resources based on the plurality of sub-requests;
   manipulating the data within the retrieved data resources into a response optimized for the endpoint device; and
   transmitting the response to the endpoint device.

2. The method of claim 1, wherein
   the data is manipulated by the at least a portion of the client-based code, and the response is transmitted to the endpoint device from the at least a portion of the client-based code.

3. The method of claim 1, wherein the data is user interface (UI) content.

4. The method of claim 1, wherein manipulating the data comprises:
   removing one or more portions of the data not needed by the endpoint device; and
   organizing the data in an optimal manner for the endpoint device.

5. The method of claim 1, wherein the one or more data resources are received concurrently.

6. The method of claim 1, wherein the one or more data resources are based upon data retrieved from additional servers, wherein the server sends one or more server-level requests for data to the additional servers.

7. The method of claim 6, further comprising, responding to a miscommunication with one or more of the additional servers using a plurality of protections, the protections including:
   substituting either default or cached data in place of data not received due to the miscommunication.

8. A non-transitory computer-readable storage medium storing instructions that, when executed by a processor, cause the processor to perform the steps of:
   delivering to at least of portion of client-based code within a server a first request for data received from an endpoint device, wherein the at least a portion of client-based code is associated with the endpoint device;
   expanding the first request into a plurality of sub-requests for at least a portion of server-based code within the server that is associated with a plurality of data resources;
   receiving from the at least a portion of server-based code one or more data resources based on the plurality of sub-requests;
   manipulating the data within the retrieved data resources into a response optimized for the endpoint device; and
   transmitting the response to the endpoint device.

9. The non-transitory computer-readable storage medium of claim 8, wherein
   the data is manipulated by the at least a portion of the client-based code, and the response is transmitted to the endpoint device from the at least a portion of the client-based code.

10. The non-transitory computer-readable storage medium of claim 8, wherein the data is user interface (UI) content.

11. The non-transitory computer-readable storage medium of claim 8, wherein manipulating the data comprises:
  removing one or more portions of the data not needed by the endpoint device; and
  organizing the data in an optimal manner for the endpoint device.

12. The non-transitory computer-readable storage medium of claim 8, wherein the one or more data resources are received concurrently.

13. The non-transitory computer-readable storage medium of claim 8, wherein the one or more data resources are based upon data retrieved from additional servers, wherein the server sends one or more server-level requests for data to the additional servers.

14. The non-transitory computer-readable storage medium of claim 13, wherein the operation further comprises, responding to a miscommunication with one or more of the additional servers using a plurality of protections, the protections including:
  substituting either default or cached data in place of data not received due to the miscommunication.

15. A system, comprising:
  a processor, and;
  a memory hosting an application, which, when executed on the processor, performs the steps:
    delivering to at least of portion of client-based code within a server a first request for data received from an endpoint device, wherein the at least a portion of client-based code is associated with the endpoint device;
    expanding the first request into a plurality of sub-requests for at least a portion of server-based code within the server that is associated with a plurality of data resources;
    receiving from the at least a portion of server-based code one or more data resources based on the plurality of sub-requests;
    manipulating the data within the retrieved data resources into a response optimized for the endpoint device; and
    transmitting the response to the endpoint device.

16. The system of claim 15, wherein
  the data is manipulated by the at least a portion of the client-based code, and the response is transmitted to the endpoint device from the at least a portion of the client-based code.

17. The system of claim 15, wherein the data is user interface (UI) content.

18. The system of claim 15, wherein manipulating the data comprises:
  removing one or more portions of the data not needed by the endpoint device; and
  organizing the data in an optimal manner for the endpoint device.

19. The system of claim 15, wherein the one or more data resources are received concurrently.

20. The system of claim 15, wherein the one or more data resources are based upon data retrieved from additional servers, wherein the server sends one or more server-level requests for data to the additional servers.

21. The system of claim 20, wherein the operation further comprises, responding to a miscommunication with one or more of the additional servers using a plurality of protections, the protections including:
  substituting either default or cached data in place of data not received due to the miscommunication.

* * * * *